United States Patent [19]

Shikina et al.

[11] Patent Number: 4,891,701
[45] Date of Patent: Jan. 2, 1990

[54] TELEVISION SIGNAL FRAME NUMBER CONVERTER CAPABLE OF DETERMINING AN OPTIMUM INTERPOLATION COEFFICIENT

[75] Inventors: Chokei Shikina; Masashi Onosato; Masakazu Tsuji; Takeo Tsutsui; Masatoshi Yorozu; Yutaka Tanaka, all of Tokyo, Japan

[73] Assignee: NEC Corporation, Japan

[21] Appl. No.: 289,188

[22] Filed: Dec. 23, 1988

[30] Foreign Application Priority Data

Dec. 25, 1987 [JP] Japan .................... 62-331803

[51] Int. Cl.⁴ ............... H04N 7/01; H04N 11/20; H04N 7/18
[52] U.S. Cl. ..................... 358/140; 358/11; 358/105
[58] Field of Search ............ 358/105, 140, 11

[56] References Cited

U.S. PATENT DOCUMENTS

| | | | |
|---|---|---|---|
| 4,163,249 | 7/1979 | Michael et al. | 358/21 R |
| 4,240,101 | 12/1980 | Michael et al. | 358/140 |
| 4,386,367 | 5/1983 | Peterson et al. | 358/140 |
| 4,587,556 | 5/1986 | Collins | 358/140 |
| 4,609,941 | 9/1986 | Carr et al. | 358/140 |
| 4,719,509 | 1/1988 | Sakamoto | 358/140 |
| 4,739,405 | 4/1988 | Sumida | 358/140 |

Primary Examiner—John K. Peng
Attorney, Agent, or Firm—Ostrolenk, Faber, Gerb & Soffen

[57] ABSTRACT

In a television signal frame number converter for converting an input television signal having a first frame number per second into an output television signal having a second frame number per second in accordance with an interpolation coefficient, a processing unit processes two successive frames of the input television signal by a frame interpolation process to produce a processed signal. A memory unit memorizes the processed signal in synchronism with a write-in address signal given by a first frame synchronizing signal of the input television signal and is read out by a read-out address signal given by a second frame synchronizing signal of a reference television signal having the second frame number per second. The converter determines the interpolation coefficient in accordance with a time interval between a write-in start timing of the memory unit and a read-out start timing of the memory unit.

3 Claims, 4 Drawing Sheets

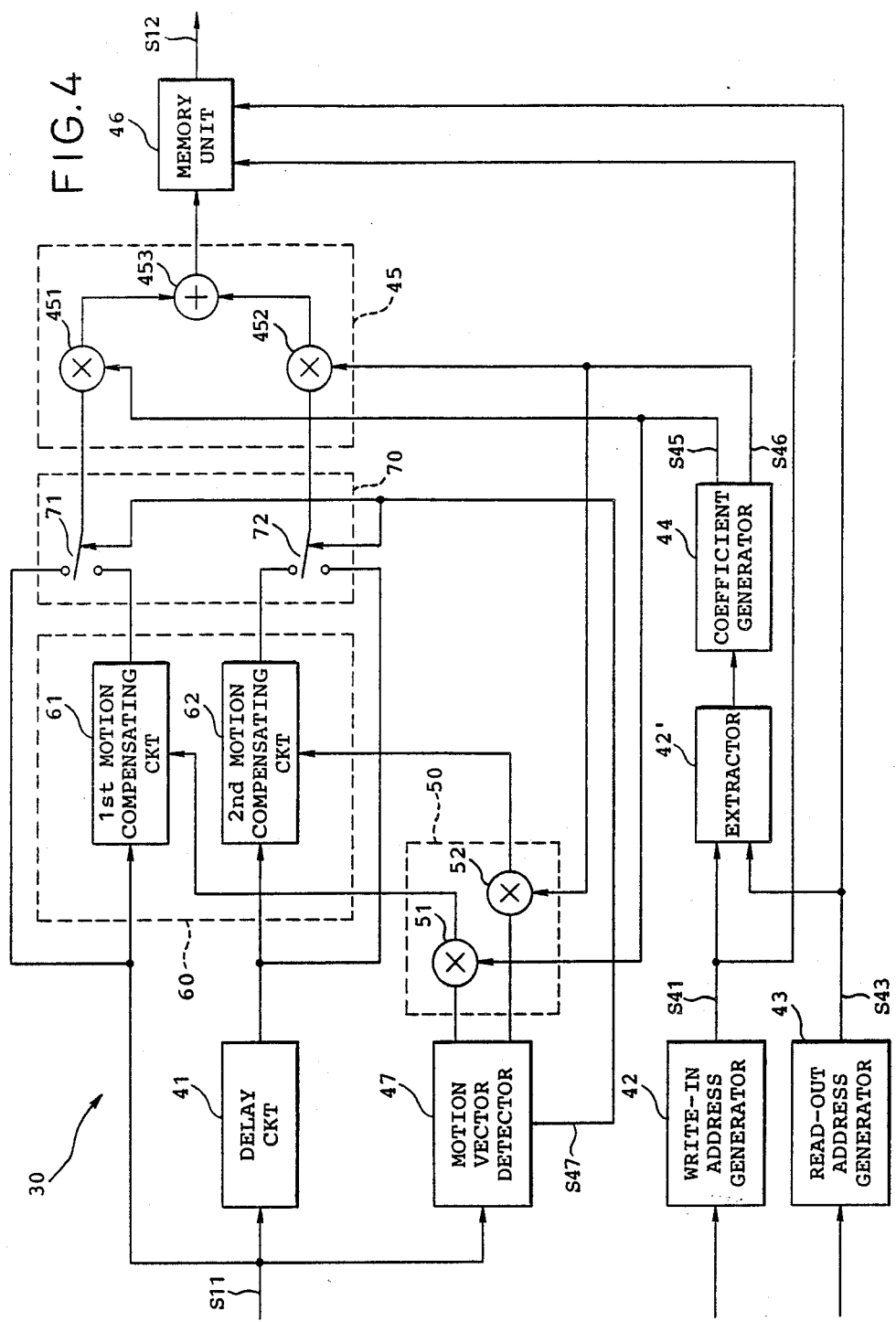

TELEVISION SIGNAL FRAME NUMBER CONVERTER CAPABLE OF DETERMINING AN OPTIMUM INTERPOLATION COEFFICIENT

BACKGROUND OF THE INVENTION

This invention relates to a frame number converter of a television signal. Such a television signal frame number converter is particularly useful in a television standard converter.

The NTSC system, the PAL system, and the SECAM system are well-known as television standards widely adopted in the world. When it comes to convert television standards, from the NTSC system to the PAL system for example, it is necessary to convert the signal having 30 frames per second to the signal having 25 frames per second.

Generally, a television signal frame number converter has a frame interpolation process, carrying out by using two successive frames of one television standard signal, and converting them into another standard signal in accordance with an interpolation coefficient.

It is obvious that an interpolation coefficient is closely related to a timing of two standard signals at an interpolating time, and varies with a lapse of time.

However, the conventional method for determining an interpolation coefficient is a stereotyped one. The interpolation coefficient has been determined by a nominal timing ratio of the two concerning television standards. Taking the NTSC system and the PAL system for instance, the PAL system's 5 frames can be processed from the NTSC system's 6 frames, using constant coefficients of 1.0, 0.8, 0.6, 0.4, and 0.2 for each, if the NTSC system and the PAL system have exact 30 and 25 frames per second, respectively.

In reality, the frame numbers of each television standard signal deviates from its nominal value, furthermore, the NTSC's real frame numbers are not equal to 30 but 59.940052/2. The difference between the nominal coefficient value and real one makes the degradation of the converted signal in picture quality.

In order to obtain the converted signal having a good picture quality, it is desirable to determine the interpolation coefficient in real time.

SUMMARY OF THE INVENTION

It is therefore an object of this invention to provide a television signal frame number converter which is capable of determining an optimum interpolation coefficient in real time.

A television signal frame number converter to which this invention is applicable is for converting an input television signal having a first frame number per second into an output television signal having a second frame number per second. The converter comprises coefficient generating means for generating a coefficient signal representing an interpolation coefficient, processing means for processing two successive frames of the input television signal by a frame interpolation process in accordance with the coefficient signal to produce a processed signal, and memory means for memorizing the processed signal in synchronism with a write-in address signal given by the input television signal. The memory means is accessed by a read-out address signal given by a reference television signal having the second frame number per second.

According to this invention, the converter further comprises first signal generating means for generating a first timing signal defined by the write-in address signal, and second signal generating means for generating a second timing signal representing a start timing of the read-out address signal in accordance with the read-out address signal. The coefficient generating means is connected to the first and the second signal generating means to vary the interpolation coefficient in response to the first timing signal generated when the second timing signal is generated.

BRIEF DESCRIPTION OF THE DRAWING

FIG. 4 is a block diagram of a television signal frame number converter according to a second embodiment of this invention.

DESCRIPTION OF THE PREFERRED EMBODIMENT

Figure 1:
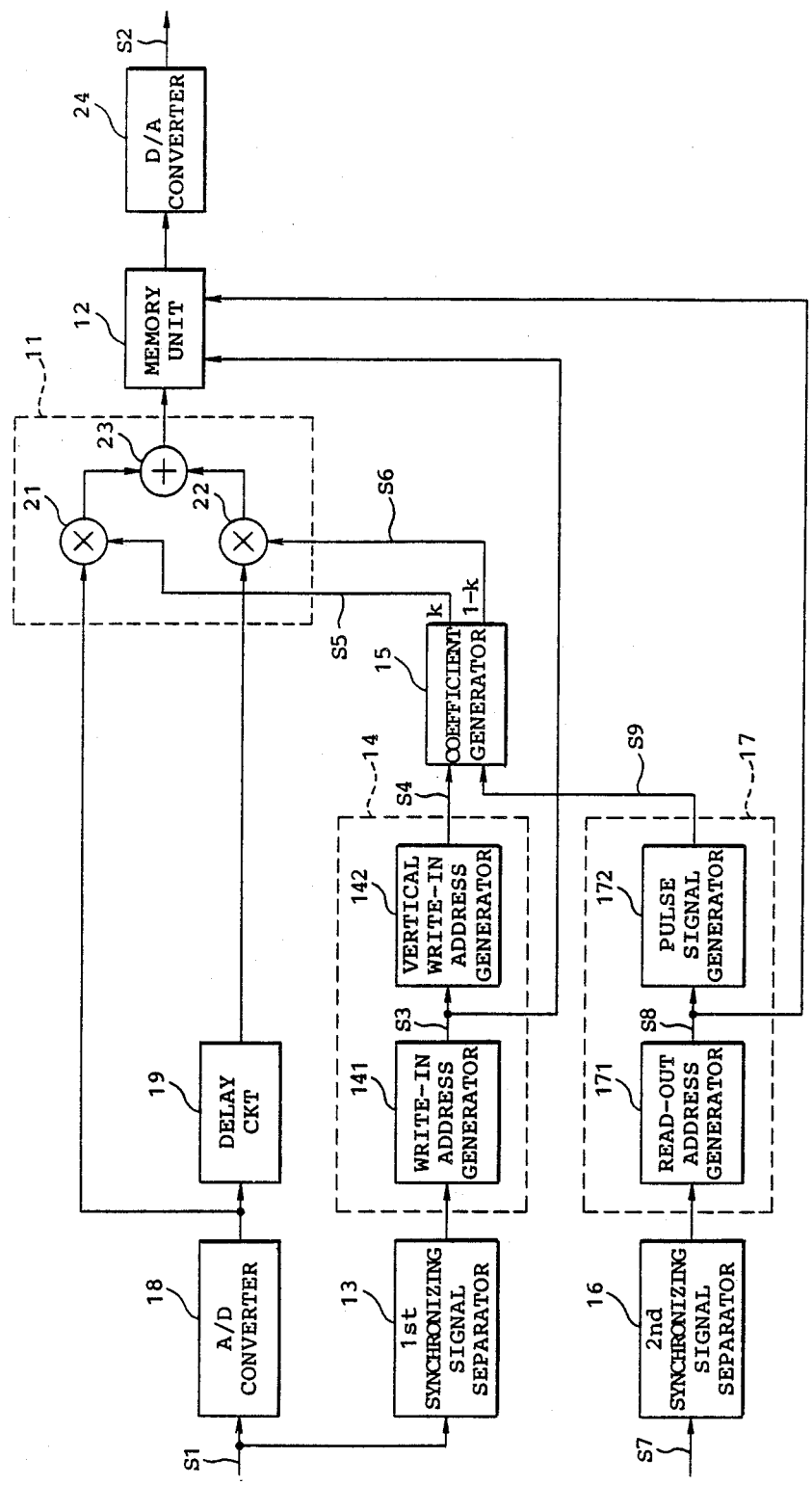
FIG. 1 is a block diagram of a television signal frame number converter according to a first embodiment of this invention.

Referring to FIG. 1, description will be made as regards a television signal frame number converter according to a first embodiment of this invention. By a frame interpolation process, the television signal frame number converter converts an input television signal $S_1$ having a first frame number per second into an output television signal $S_2$ having a second frame number per second. The first frame number is not smaller than the second frame number. In other words, the input television signal $S_1$ has a first frame frequency while the output television signal $S_2$ has a second frame frequency which is not higher than the first frame frequency. The television signal frame number converter comprises a processing unit 11 and a memory unit 12.

A first synchronizing signal separator 13 is supplied with the input television signal $S_1$. The first synchronizing signal separator 13 separates a first vertical synchronizing signal from the input television signal $S_1$ and delivers the first vertical synchronizing signal to a write-in address generating unit 14. The write-in address generating unit 14 comprises a write-in address generator 141 and a vertical write-in address generator 142. Supplied with the first vertical synchronizing signal, the write-in address generator 141 generates a write-in address signal $S_3$ representing a write-in address for the memory unit 12. The write-in address signal $S_3$ has the first frame frequency. In response to the write-in address signal $S_3$, the vertical write-in address generator 142 generates a vertical write-in address signal $S_4$ corresponding to horizontal scanning lines of a television image. The vertical write-in address signal $S_4$ has a constant cycle and may therefore be called a first timing signal. The vertical write-in address signal $S_4$ is supplied to a coefficient generator 15. As will later be described, the coefficient generator 15 is for generating interpolation coefficients in the form of first and second coefficient signals $S_5$ and $S_6$. The first coefficient signal $S_5$ represents a first coefficient k which has a value between 0 and 1. The second coefficient signal $S_6$ represents a second coefficient $(1-k)$.

In the manner known in the art, a reference television signal $S_7$ of the second frame number per second is supplied to a second synchronizing signal separator 16. The synchronizing signal separator 16 separates a second vertical synchronizing signal from the reference television signal $S_7$ and delivers the second vertical synchronizing signal to a read-out address generating unit 17. The read-out address generating unit 17 comprises a read-out address generator 171 and a pulse signal generator 172. Supplied with the second vertical synchronizing signal, the read-out address generator 171 generates a read-out address signal $S_8$ for the memory unit 12. The read-out address signal $S_8$ has the second frame frequency. In response to the read-out address signal $S_8$, the pulse signal generator 172 generates a start pulse signal $S_9$ at heads of the read-out address signal $S_8$ and delivers the start pulse signal $S_9$ to the coefficient generator 15. The start pulse signal $S_9$ indicates a start timing of the read-out address signal $S_8$ and may be called a second timing signal. The coefficient generator 15 calculates the first and the second coefficients k and $(1-k)$ in accordance with the vertical write-in address generated when the start pulse signal $S_9$ is generated.

Figure 2:
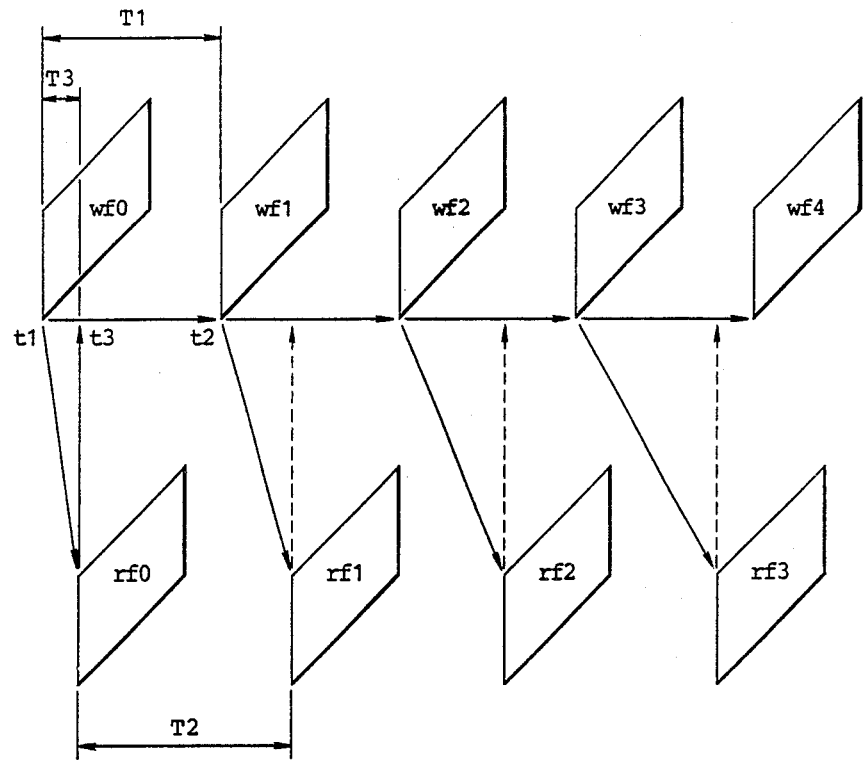
FIG. 2 is a view for use in describing an operation of the television signal frame number converter illustrated in FIG. 1.

Referring to FIG. 2, description will be directed to principles of the frame interpolation process and a method of determining the first and the second coefficients k and $(1-k)$ according to this invention. The frame interpolation process is carried out in connection with each field of the input television signal by a method, such as a weighted mean method known in the art.

In FIG. 2, zeroth through fourth input fields of the input television signal are depicted at $wf_0$, $wf_1$, $wf_2$, $wf_3$, and $wf_4$ which are arranged at a first time interval $T_1$. Zeroth through third output fields of the output television signal are depicted at $rf_0$, $rf_1$, $rf_2$, and $rf_3$ which are arranged at a second time interval $T_2$. The first time interval $T_1$ is not longer than the second time interval $T_2$. The first time interval $T_1$ is equal to a write-in cycle time of the memory unit 12 (FIG. 1) for each field and is defined by a write-in start timing and a write-in end timing of a write-in cycle. The write-in start and the write-in end timings are depicted by $t_1$ and $t_2$, respectively. On the other hand, the second time interval $T_2$ is equal to a read-out cycle time of the memory unit 12.

In the example being illustrated, the zeroth output field $rf_0$ is derived from the zeroth and the first input fields $wf_0$ and $wf_1$ by the frame interpolation process and is read out of the memory unit 12 at a read-out start timing depicted by $t_3$. The read-out start timing may be called a frame interpolation timing. The zeroth and the first input fields $wf_0$ and $wf_2$ are weighted by first and second weighting coefficients, respectively. The first and the second weighting coefficients are determined by a third time interval $T_3$ between the write-in start timing $t_1$ and the read-out start timing $t_3$. Although the third time interval $T_3$ varies with a lapse of time, it can be represented by the write-in address or the vertical write-in address described before. Thus, the first and the second weighting coefficients are determined in real time and serve as the first and the second coefficients k and $(1-k)$, respectively. In the principles described above, the remaining first through the third output fields $rf_1$ to $rf_3$ are derived from the first and the second input fields $wf_1$ and $wf_2$, the second and the third input fields $wf_2$ and $wf_3$, and the third and the fourth input fields $wf_3$ and $wf_4$, respectively. The above-described frame interpolation process may be called a linear frame interpolation process.

Referring back to FIG. 1, an analog-to-digital (A/D) converter 18 is supplied with the input television signal $S_1$ and converts the input television signal $S_1$ into a digital television signal. The digital television signal is supplied to a delay circuit 19 and to the processing unit 11. The delay circuit 19 gives the digital television signal a delay equal to one frame of the digital television signal to deliver a delayed digital television signal to the processing unit 11.

By the frame interpolation process, the processing unit 11 processes the digital television signal and the delayed digital television signal in accordance with the first and the second coefficient signals $S_5$ and $S_6$ to produce a processed signal. In other words, the processing unit 11 processes two successive frames of the digital television signal at a time. For this purpose, the processing unit 11 comprises first and second multipliers 21 and 22 and an adder 23. The first multiplier 21 multiplies the digital television signal by the first coefficient k and delivers a first multiplied signal representing a first multiplied value to the adder 23. The second multiplier 22 multiplies the delayed digital television signal by the second coefficient $(1-k)$ and delivers a second multiplied signal representing a second multiplied value to the adder 23. Thus, the digital television signal and the delayed digital television signal are weighted by the first and the second coefficients k and $(1-k)$, respectively. Supplied with the first and the second multiplied signals, the adder 23 calculates a mean value between the first and the second multiplied values and produces a weighted mean signal as the processed signal.

The processed signal is supplied to the memory unit 12. The memory unit 12 memorizes the processed signal as a stored television signal in synchronism with the write-in address signal $S_3$. Although the processed signal, namely, the stored television signal has an unnecessary frame for the output television signal, the unnecessary frame is skipped in read-out operation of the memory unit 12 because the memory unit 12 is read out by the second frame frequency which is no higher than the first frame frequency of the write-in address signal. Read from the memory unit 12, a read-out television signal is supplied to a digital-to-analog (D/A) converter 24. The digital-to-analog converter 24 converts the read-out television signal into an analog signal and produces the analog signal as the output television signal $S_2$ having the second frame number per second.

Figure 3:
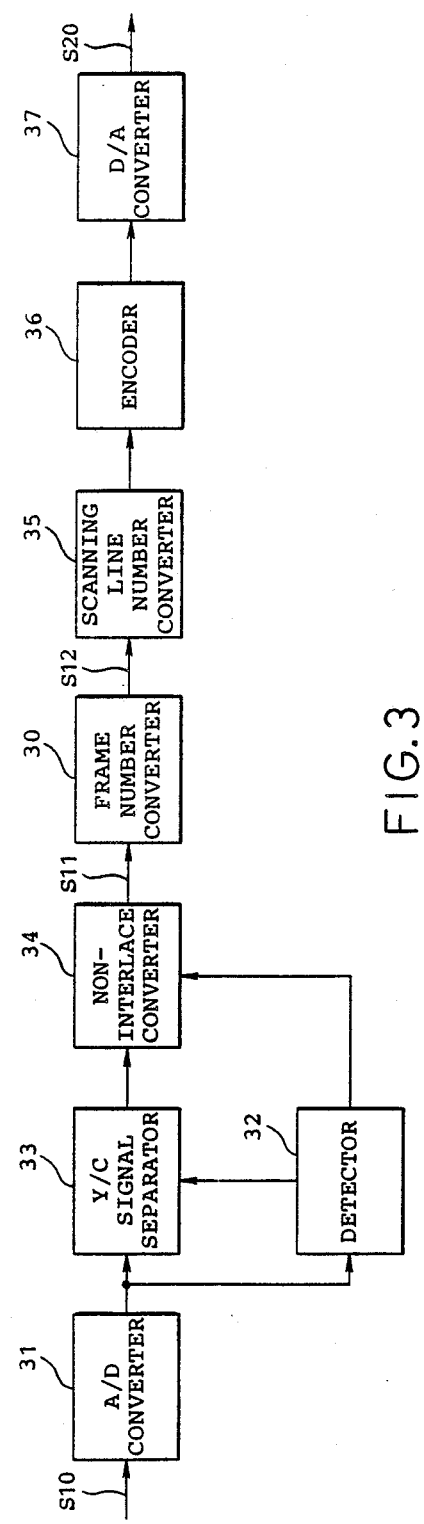
FIG. 3 is a block diagram of a television signal standards converter to which this invention is applied.

Referring afresh to FIG. 3, description will be directed to a television signal standards converter to which this invention is applied. The television signal standards converter is operable to convert an input television signal $S_{10}$ of the NTSC system into an output television signal $S_{20}$ of the PAL system. Accordingly, the input television signal $S_{10}$ has 30 frames (namely, 60 fields) per second while the output television signal has 25 frames (namely, 50 fields) per second. The illustrated converter comprises a frame number converter 30 according to a preferred embodiment of this invention and the other portions which may be structured in a known manner. In this connection, the portions except the frame number converter 30 will be simply described in comparison with the frame number converter 30.

The input television signal $S_{10}$ is converted by an analog-to-digital (A/D) converter 31 into a digital television signal. The digital television signal is supplied to a detector 32 and a Y/C signal separator 33 of a motion adaptive type. Responsive to the digital television signal, the detector 32 detects a moving part and an edge portion appearing in the television signal and produces a motion detection signal and an edge detection signal on detection of the moving part and the edge portion, respectively The motion and the edge detection signals are supplied to the Y/C signal separator 33 together with the digital television signal so as to separate a Y/C signal adapted to a motion from the digital television signal in a known manner. More specifically, the Y/C signal separator 32 comprises a temporal filter and a spatial filter both of which are adaptively switched from one to another in response to the motion and the edge detection signals. At any rate, the Y/C signal separator 32 carries out Y/C signal separation in a still part specified by no detection of the motion detection signal by utilizing correlation between two successive frames of the digital television signal. When the moving part is specified by detection of the motion detection signal with the edge detection signal, the Y/C signal separator 32 carries out the Y/C signal separation by utilizing the correlation of a vertical direction of the television image, namely, the correlation between two horizontal scanning lines which are adjacent to each other. On the other hand, if the edge detection signal is present, the Y/C signal separator 32 carries out the Y/C signal separation by utilizing the correlation of a horizontal direction of the television image. Thus, the Y/C signal separator 32 produces a separated luminance (Y) signal and a separated chrominance (C) signal, which may appear in an interlaced manner and which may be called interlaced Y and C signals. The interlaced Y and C signals are sent to a non-interlace converter 34 of a motion adaptive type.

The non-interlace converter 34 of a motion adaptive type is also supplied with the motion detection signal from the detector 32. As known in the art, the non-interlace converter 34 of a motion adaptive type comprises a plurality of interpolation filters and selects one of the interpolation filters in response to the motion detection signal. In the still part of the television image, the non-interlace converter 34 interpolates the horizontal scanning line by using information of two successive fields. In the moving part of the image, the non-interlace converter 34 interpolates the horizontal scanning line by using the information of one field. Thus, the interlaced Y and C signals are converted by the non-interlace converter 34 into non-interlaced signals as a converted signal $S_{11}$.

The converted signal $S_{11}$ is supplied to the frame number converter 30. In the manner described in conjunction with FIG. 2, the frame number converter 30 converts the converted signal $S_{11}$ having 30 frames per second into a frame converted signal $S_{12}$ having 25 frames per second. Each frame of the converted signal $S_{11}$ is formed by horizontal scanning lines of 525 and should be converted into a frame formed by horizontal scanning lines of 625, as well known in the art. To this end, the frame converted signal $S_{12}$ is supplied to a scanning line number converter 35. The scanning line number converter 35 converts the frame converted signal $S_{12}$ having the horizontal scanning lines of 525 per frame into a line converted signal having the horizontal scanning lines of 625 per frame. Then, the scanning line number converter 35 interlaces the line converted signal in a known manner and produces a line interlaced signal. The line interlaced signal is sent to an encoder 36. The encoder 36 encodes the line interlaced signal into an encoded signal of the PAL system and delivers the encoded signal to a digital-to-analog (D/A) converter 37. The digital-to-analog converter 37 converts the encoded signal into an analog signal. The analog signal is produced as the output television signal $S_{20}$.

Referring to FIG. 4, the description will be made as regards the frame number converter 30 illustrated in FIG. 3 in detail. The frame number converter 30 comprises a delay circuit 41, a write-in address generator 42, an extractor 42', a read-out address generator 43, a coefficient generator 44, a processing unit 45, and a memory unit 46. The coefficient generator 44 and the processing unit 45 may be similar in structure to those illustrated in FIG. 1 and will therefore not be described in detail.

In addition to the linear frame interpolation process, the frame number converter 30 carries out a motion compensating frame interpolation process for compensating for the moving part of the television image. For this purpose, the frame number converter 30 further comprises a motion vector detector 47, a multiplying unit 50 comprising first and second multipliers 51 and 52, and a compensating unit 60 comprising first and second motion compensating circuits 61 and 62. The frame number converter 30 still further comprises a selecting unit 70 comprising first and second selecting circuits 71 and 72. Each of the first and the second selecting circuits 71 and 72 is simultaneously switched to carry out a selected one of the linear frame interpolation process and the motion compensating frame interpolation process. Each of the processes is selected in a manner to be later described.

As described in conjunction with FIG. 1, the write-in address generator 42 produces a write-in address signal $S_{41}$ in response to the first synchronizing signal derived from the input television signal. In response to the second synchronizing signal derived from the reference television signal of the PAL system, the read-out address generator 43 produces a read-out address signal $S_{43}$. Supplied with the write-in address signal $S_{41}$ and the read-out address signal $S_{43}$, the extractor 42' extracts the write-in address signal $S_{41}$ at a start timing of the read-out address signal $S_{43}$ and produce an extracted write-in address signal. Responsive to the extracted write-in address signal, the coefficient generator 44 calculates first and second coefficients k and (1−k) in accordance with the extracted write-in address signal and produces first and second coefficient signals $S_{45}$ and $S_{46}$ representing the first and the second coefficients k and (1−k), respectively.

The motion vector detector 50 is operable to detect a motion vector of the moving part of the television image in the manner known in the art. In response to the converted signal $S_{11}$ produced from the non-interlace converter 34 (FIG. 3), the motion vector detector 47 produces first and second motion vector signals and a control signal $S_{47}$ on detection of the motion vector.

Supplied with the converted signal $S_{11}$, the delay circuit 41 produces a delayed signal having a delay equal to one frame of the converted signal $S_{11}$ In the absence of the control signal $S_{47}$, the first selecting circuit 71 selects the converted signal $S_{11}$ and supplies the processing unit 45 with the converted signal $S_{11}$. Similarly, the second selecting circuit 72 selects the delayed signal produced from the delay circuit 41 and supplies the processing unit 45 with the delayed signal in the absence of the control signal $S_{47}$. This means that the frame number converter 30 carries out the linear frame interpolation process described in conjunction with FIG. 1. The linear frame interpolation process will therefore not be described any longer.

Next, description will be made as regards the motion compensating frame interpolation process.

The first and the second motion vector signals produced from the motion vector detector 47 are weighted by the first and the second multipliers 51 and 52 in accordance with the first and the second coefficient signals $S_{45}$ and $S_{46}$, respectively.

Supplied with the first motion vector signal and the first coefficient signal $S_{45}$, the first multiplier 51 multiplies the first motion vector signal by the first coefficient k and delivers a first weighted motion vector signal to the first motion compensating circuit 61. In response to the second motion vector signal and the second coefficient signal $S_{46}$, the second multiplier 52 multiplies the second motion vector signal by the second coefficient $(1-k)$ and delivers a second weighted motion vector signal to the second motion compensating circuit 62. Supplied with the first weighted motion vector signal and the converted signal $S_{11}$, the first motion compensating circuit 61 carries out a compensating operation for the moving part in accordance with the first weighted motion vector signal and produces a first compensated signal. Similarly, supplied with the delayed signal and the second weighted motion vector signal, the second motion compensating circuit 62 carries out the compensating operation in accordance with the second weighted motion vector signal and produces a second compensated signal. When the motion vector detector 47 produces the control signal $S_{47}$, the first and the second selecting circuits 71 and 72 select the first and the second compensated signals, respectively, and send the first and the second compensated signals to the processing unit 45.

The processing unit 45 comprises first and second multipliers 451 and 452 and an adder 453. Responsive to the first and the second compensated signals and the first and the second coefficient signals $S_{45}$ and $S_{46}$, the processing unit 45 carries out the motion compensating frame interpolation process and produces a processed signal. The processed signal is supplied to the memory unit 46. In synchronism with the write-in address signal $S_{41}$, the memory unit 46 memorizes the processed signal as a stored signal. As described in conjunction with FIG. 1, the memory unit 46 is read out by the read-out address signal $S_{43}$. Read from the memory unit 46, a read-out television signal is produced as the frame converted signal $S_{12}$ having 25 frames per second.

While this invention has thus far been described in conjunction with several preferred embodiments thereof, it will readily be possible for those skilled in the art to put this invention into practice in various other manners. The television signal frame number converter according to this invention is applicable to a frame number conversion between the NTSC system and the SECAM system and between the SECAM system and the PAL system.

What is claimed is:

1. A television signal frame number converter for converting an input television signal having a first frame number per second into an output television signal having a second frame number per second, said converter comprising coefficient generating means for generating a coefficient signal representing an interpolation coefficient, processing means for processing two successive frames of said input television signal by a frame interpolation process in accordance with said coefficient signal to produce a processed signal, and memory means for memorizing said processed signal in synchronism with a write-in address signal given by a first synchronizing signal of said input television signal, said memory means being accessed by a read-out address signal given by a second synchronizing signal of a reference television signal having said second frame number per second, wherein the improvement comprises:

first signal generating means for generating a first timing signal defined by said write-in address signal; and second signal generating means for generating a second timing signal representing a start timing of said read-out address signal in accordance with said read-out address signal;

said coefficient generating means being connected to said first and said second signal generating means to vary said interpolation coefficient in response to the first timing signal generated when said second timing signal is generated.

2. A television signal frame number converter for converting an input television signal having a first frame number per second into an output television signal having a second frame number per second, said converter comprising coefficient generating means for generating a coefficient signal representing an interpolation coefficient, processing means for processing two successive frames of said input television signal by a frame interpolation process in accordance with said coefficient signal to produce a processed signal, and memory means for memorizing said processed signal in synchronism with a write-in address signal given by a first synchronizing signal of said input television signal, said memory means being accessed by a read-out address signal given by a second synchronizing signal of a reference television signal having said second frame number per second,, wherein the improvement comprises:

means responsive to said write-in address signal and said read-out address signal for extracting said write-in address signal at a start timing of said read-out address signal to produce an extracted write-in address signal;

said coefficient generating means being connected to said means to vary said interpolation coefficient in response to said extracted write in address signal.

3. A television signal frame number converter as claimed in claim 1, wherein said converter further comprises:

detecting means responsive to said input television signal for detecting a motion vector by utilizing correlation between said two successive frames to produce a motion vector signal representing said motion vector on detection of said motion vector, said detecting means further producing a control signal together with said motion vector signal;

weighting means responsive to said coefficient signal and said motion vector signal for weighting said motion vector signal by said coefficient signal to produce a weighted motion vector signal;

compensating means for compensating said two successive frames in accordance with said weighted motion vector signal to produce compensated two successive frames; and selecting means responsive to said two successive frames, said two compensated successive frames, and said control signal for selecting one of said two successive frames and said compensated two successive frames to deliver a selected one of said two successive frames and said compensated two successive frames to said processing means, said selecting means selecting said compensated two successive frames on presence of said control signal and selecting said two successive frames on absence of said control signal.

* * * * *

UNITED STATES PATENT AND TRADEMARK OFFICE
CERTIFICATE OF CORRECTION

PATENT NO. : 4,891,701
DATED : January 2, 1990
INVENTOR(S) : Chokei Shikima et al.

It is certified that error appears in the above-identified patent and that said Letters Patent is hereby corrected as shown below:

On the title page, Item [73] should read
--Nippon Hoso Kyokai, Japan-- as an assignee.

Signed and Sealed this

Twelfth Day of February, 1991

*Attest:*

HARRY F. MANBECK, JR.

*Attesting Officer*   *Commissioner of Patents and Trademarks*

UNITED STATES PATENT AND TRADEMARK OFFICE
CERTIFICATE OF CORRECTION

PATENT NO. : 4,891,701
DATED : January 2, 1990
INVENTOR(S) : Chokei Shikima et al.

It is certified that error appears in the above-identified patent and that said Letters Patent is hereby corrected as shown below:

On the title page, Item [73] should read

--Nippon Hoso Kyokai, Japan and NEC Corporation, Japan-- as assignees.

This certificate supersedes Certificate of Correction issued February 12, 1991.

Signed and Sealed this

First Day of September, 1992

Attest:

DOUGLAS B. COMER

Attesting Officer      Acting Commissioner of Patents and Trademarks